(12) United States Patent
Park et al.

(10) Patent No.: US 8,923,792 B2
(45) Date of Patent: Dec. 30, 2014

(54) METHOD FOR RECEIVING RADIO SIGNAL AND DEVICE THEREFOR

(71) Applicant: LG Electronics Inc., Seoul (KR)

(72) Inventors: Hanjun Park, Anyang-si (KR); Jonghyun Park, Anyang-si (KR); Kijun Kim, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/935,906

(22) Filed: Jul. 5, 2013

(65) Prior Publication Data

US 2014/0011468 A1    Jan. 9, 2014

Related U.S. Application Data

(60) Provisional application No. 61/668,418, filed on Jul. 5, 2012.

(51) Int. Cl.
| | | |
|---|---|---|
| *H04B 1/06* | (2006.01) | |
| *H04B 7/08* | (2006.01) | |
| *H04B 7/04* | (2006.01) | |
| *H04B 7/02* | (2006.01) | |

(52) U.S. Cl.
CPC ............ *H04B 7/0802* (2013.01); *H04B 7/0417* (2013.01); *H04B 7/024* (2013.01); *H04B 7/0874* (2013.01); *H04B 7/086* (2013.01)
USPC ......................................... 455/272; 370/334

(58) Field of Classification Search
USPC ......................................... 455/272; 370/334
See application file for complete search history.

(56) References Cited

U.S. PATENT DOCUMENTS

2007/0243831 A1* 10/2007 Seki ................................ 455/69
2012/0263245 A1* 10/2012 Carbonelli et al. ........... 375/260

* cited by examiner

*Primary Examiner* — Lee Nguyen
(74) *Attorney, Agent, or Firm* — Birch, Stewart, Kolasch & Birch, LLP

(57) ABSTRACT

A method for receiving a radio signal by a receiver including a 2-dimensional antenna array which consists of a plurality of antenna elements in a wireless communication system includes: dividing the plurality of antenna elements into a plurality of groups; determining a group-specific reception beam for each of the plurality of groups; applying the group-specific reception beam to a channel corresponding to each of the plurality of groups to acquire virtual channels respectively corresponding to the plurality of groups; and estimating channels respectively corresponding to the plurality of groups based on reference signals received through the virtual channels.

10 Claims, 8 Drawing Sheets

FIG. 5
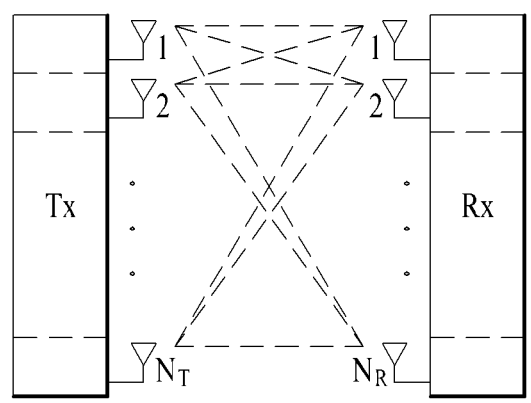
(a)
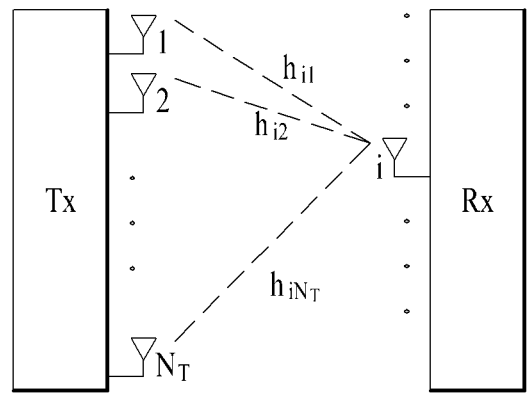
(b)

METHOD FOR RECEIVING RADIO SIGNAL AND DEVICE THEREFOR

This application claims the benefit of U.S. Provisional Application No. 61/668,418, filed on Jul. 5, 2012, which is hereby incorporated by reference as if fully set forth herein.

BACKGROUND OF THE INVENTION

1. Field of the Invention

The present invention relates to a wireless communication system, and more particularly, to a method and device for receiving uplink/downlink signals.

2. Discussion of the Related Art

With the advent and propagation of various devices such as smartphones, tablet PCs, etc. and technologies which require machine-to-machine (M2M) communication and high data throughput, the quantity of data that needs to be processed in a cellular network has rapidly increased. To satisfy rapidly increasing data throughput, carrier aggregation, cognitive radio technology, etc. for efficiently using a wider frequency band and multiple-input multiple-output (MIMO), cooperative multi-point (CoMP), etc. for increasing data throughput within a limited frequency band have been developed. Furthermore, communication environments are evolved such that the density of nodes which can be accessed by a user equipment (UE) increases. A node refers to a fixed point including one or more antennas and capable of transmitting/receiving radio signals to/from a UE. A communication system including high-density nodes can provide high performance communication services to UEs according to cooperation between nodes.

CoMP communication in which a plurality of nodes communicates with a UE using the same time-frequency domain has data throughput much higher than that of a conventional communication scheme in which each node operates as an independent base station (BS) to perform communication with a UE without cooperation.

A multi-node system performs cooperative communication using plural nodes each of which operates as a BS, access point, antenna, antenna group, radio remote header (RRH) or radio remote unit (RRU). The plural nodes are spaced apart from one another by a predetermined distance or more in the multi-node system, unlike a conventional centralized antenna system in which antennas are concentrated in a BS. The plural nodes can be managed by one or more BSs or BS controllers which control operation of each node or schedule data to be transmitted/received through each node. Each node is connected to a BS or a BS controller which manages the corresponding node via a cable or a dedicated line.

The multi-node system can be regarded as a MIMO system since distributed nodes can communicate with one or more UEs by simultaneously transmitting/receiving different streams. However, in the multi-node system, a transmission area that needs to be covered by each antenna is reduced, compared to an area covered by each antenna included in the conventional centralized antenna system, because signals are transmitted using nodes distributed in a plurality of locations. Accordingly, the multi-node system can reduce power necessary for each antenna to transmit a signal compared to a conventional centralized antenna system employing MIMO. Furthermore, a transmission distance between an antenna and a UE is reduced and thus path loss is decreased and fast data transmission is enabled. Therefore, throughput and power efficiency of a cellular system can be improved and communication performance with relatively uniform quality can be satisfied irrespective of the position of a UE in a cell. In addition, in the multi-node system, BSs or BS controllers connected to plural nodes cooperatively transmit/receive data so as to reduce signal loss during signal transmission. Moreover, when nodes spaced apart from one another perform cooperative communication with a UE, inter-antenna correlation and interference are reduced. Therefore, according to the CoMP communication scheme, a high signal-to-interference-plus-noise ratio (SINR) can be obtained.

Owing to the above-mentioned advantages of the multi-node system, the multi-node system replaces the conventional centralized antenna system or is employed along with the centralized antenna system as a new cellular communication system in order to reduce BS establishment costs and backhaul network maintenance costs in next-generation mobile communication systems, extend service coverage and increase channel capacity and SINR.

SUMMARY OF THE INVENTION

Accordingly, the present invention is directed to a method for efficiently receiving a radio signal.

Furthermore, an object of the present invention is to provide a method for improving a situation in which transmission power of a reference signal is reduced.

The technical problems solved by the present invention are not limited to the above technical problems and those skilled in the art may understand other technical problems from the following description.

To achieve these objects and other advantages and in accordance with the purpose of the invention, as embodied and broadly described herein, a method for receiving a radio signal in a receiver including a 2-dimensional antenna array which consists a plurality of antenna elements in a wireless communication system, the method including: dividing the plurality of antenna elements into a plurality of groups; determining a group-specific reception beam for each of the plurality of groups; applying the group-specific reception beam to a channel corresponding to each of the plurality of groups to acquire virtual channels respectively corresponding to the plurality of groups; and estimating channels respectively corresponding to the plurality of groups based on reference signals received in the virtual channels.

Preferably, the dividing of the plurality of antenna elements may include assigning at least two antenna elements of the plurality of antenna elements to the same group if a correlation metric between at least two channels corresponding to the at least two antenna elements is higher than a specific value.

Preferably, the determining of the group-specific reception beam may include selecting the group-specific reception beam from a candidate set for each of the plurality of groups such that the intensity of a signal received in each of the plurality of groups is maximized, wherein the candidate set consists of one or more candidate reception beams.

Preferably, the candidate set may be shared between two or more of the plurality of groups.

Preferably, the method may further include selecting one or more candidate reception beams within a predetermined distance from the group-specific reception beam selected from the candidate set for each of the plurality of groups to update the candidate set for each of the plurality of groups.

In another aspect of the present invention, a receiver including a 2-dimensional antenna array which consists of a plurality of antenna elements in a wireless communication system includes: a radio frequency (RF) unit; and a processor configured to control the RF unit, wherein the processor is configured to divide the plurality of antenna elements into a plurality of groups, to determine a group-specific reception beam for each of the plurality of groups, to apply the group-specific reception beam to a channel corresponding to each of the plurality of groups to acquire virtual channels respectively corresponding to the plurality of groups and to estimate channels respectively corresponding to the plurality of groups based on reference signals received in the virtual channels.

Preferably, the processor may be configured to assign at least two antenna elements of the plurality of antenna elements to the same group if a correlation metric between at least two channels corresponding to the at least two antenna elements is higher than a specific value.

Preferably, the processor may be configured to select the group-specific reception beam from a candidate set for each of the plurality of groups such that the intensity of a signal received through each of the plurality of groups is maximized, wherein the candidate set consists of one or more candidate reception beams.

Preferably, the candidate set may be shared between two or more of the plurality of groups.

Preferably, the processor may be configured to select one or more candidate reception beams within a predetermined distance from the group-specific reception beam selected from the candidate set for each of the plurality of groups to update the candidate set for each of the plurality of groups.

The above and other aspects of the present invention will be described in detail through preferred embodiments with reference to the accompanying drawings so that the present invention can be easily understood and realized by those skilled in the art.

According to an embodiment of the present invention, a radio signal can be efficiently received.

Furthermore, power of a reference signal can be boosted.

The effects of the present invention are not limited to the above-described effects and other effects which are not described herein will become apparent to those skilled in the art from the following description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 illustrates MIMO used in 3GPP LTE/LTE-A;

DETAILED DESCRIPTION OF THE INVENTION

Figure 1:
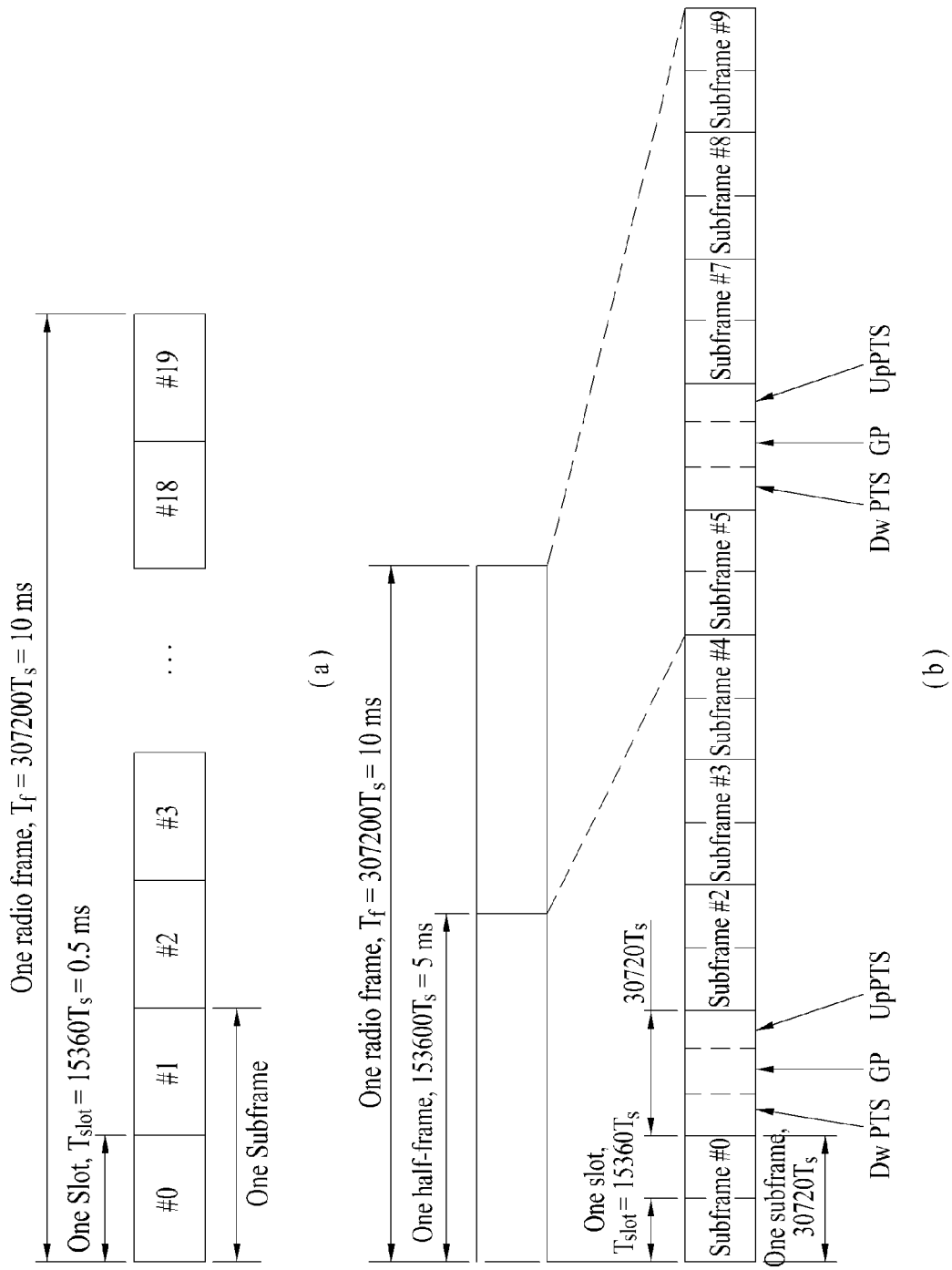
FIG. 1 illustrates an exemplary radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and 30 another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200Ts) and includes 10 subframes in equal size. The 10 subframes in the radio frame may be numbered. Here, Ts denotes sampling time and is represented as Ts=1/(2048*15kHz). Each subframe has a length of 1ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS ee | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 2:
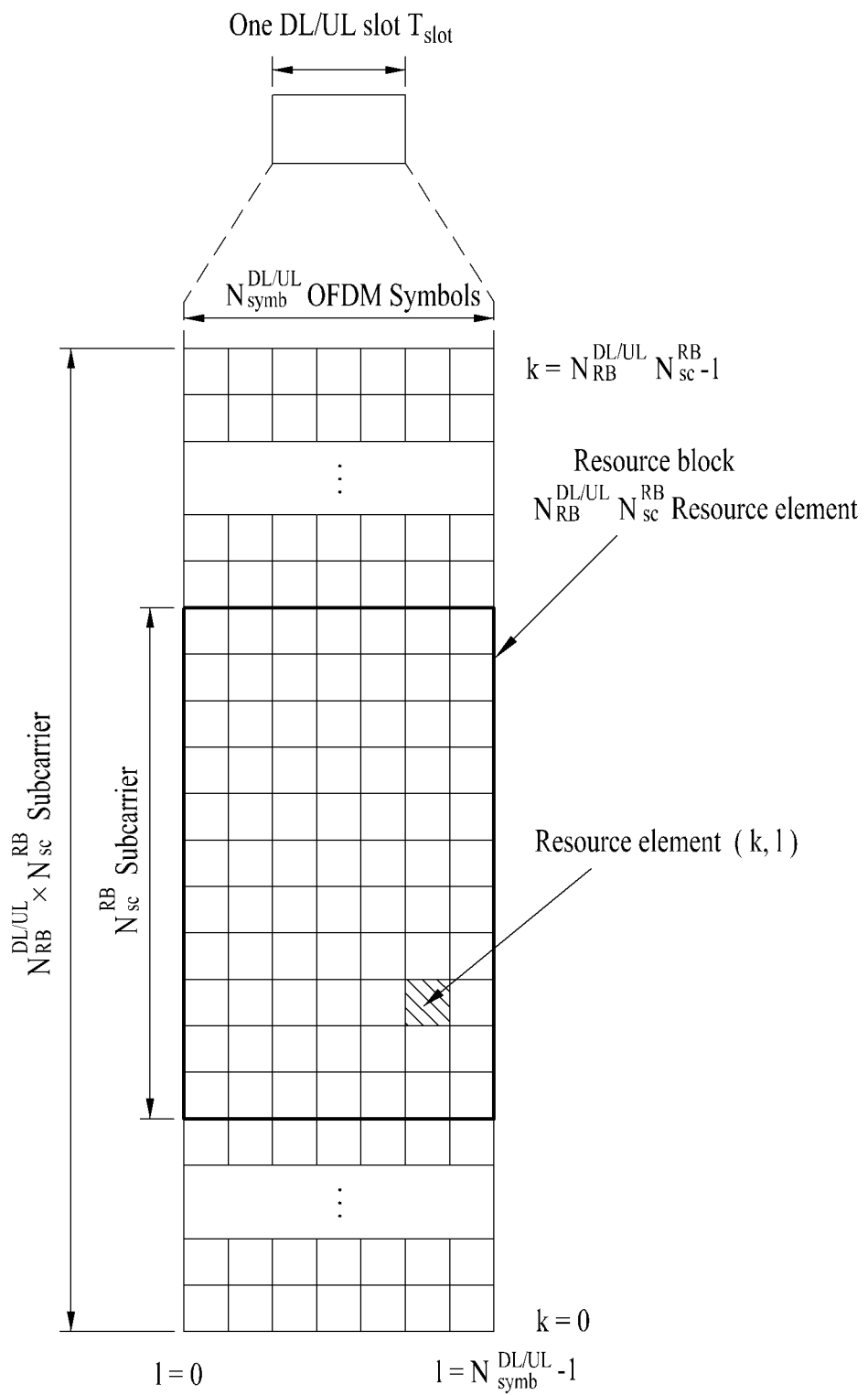
FIG. 2 illustrates an exemplary downlink/uplink slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{UL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DU/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ subcarriers in a subframe and respectively disposed in two slots of the subframe are called a physical resource block (PRB) pair. Two RBs constituting a PRB pair have the same PRB number (or PRB index).

Figure 3:
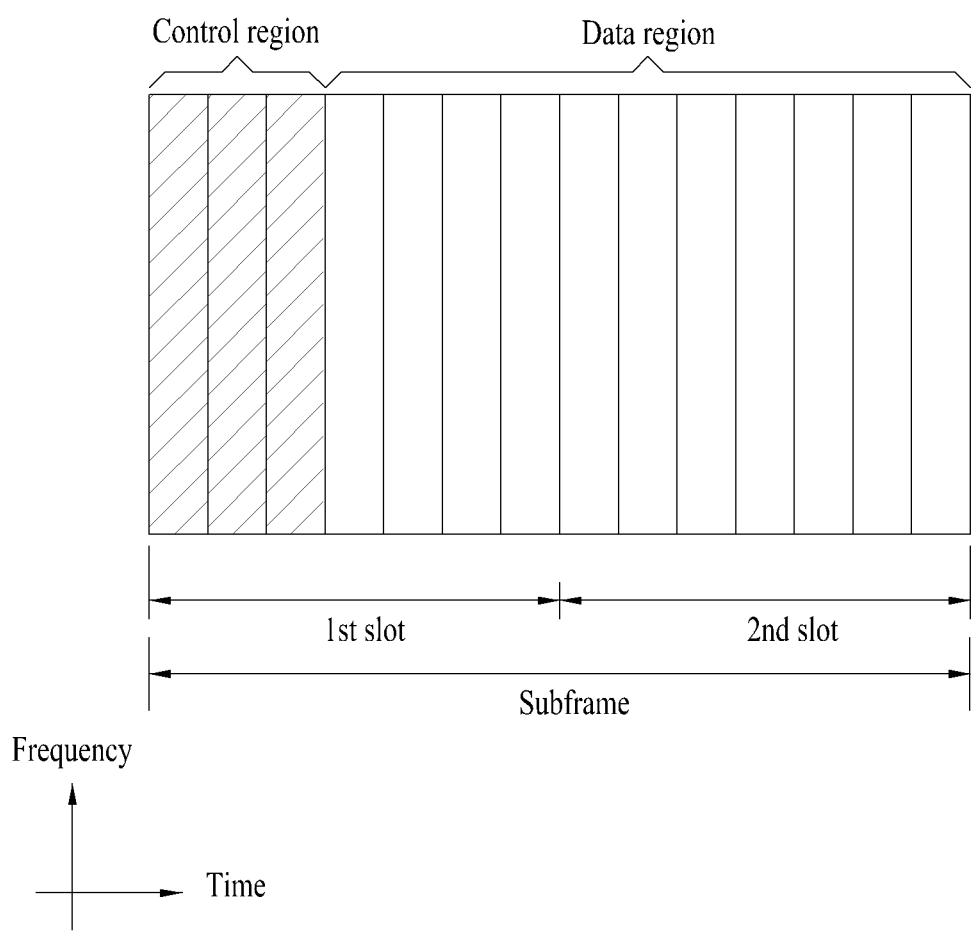
FIG. 3 illustrates an exemplary downlink subframe structure used in 3GPP LTE/LTE-A.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
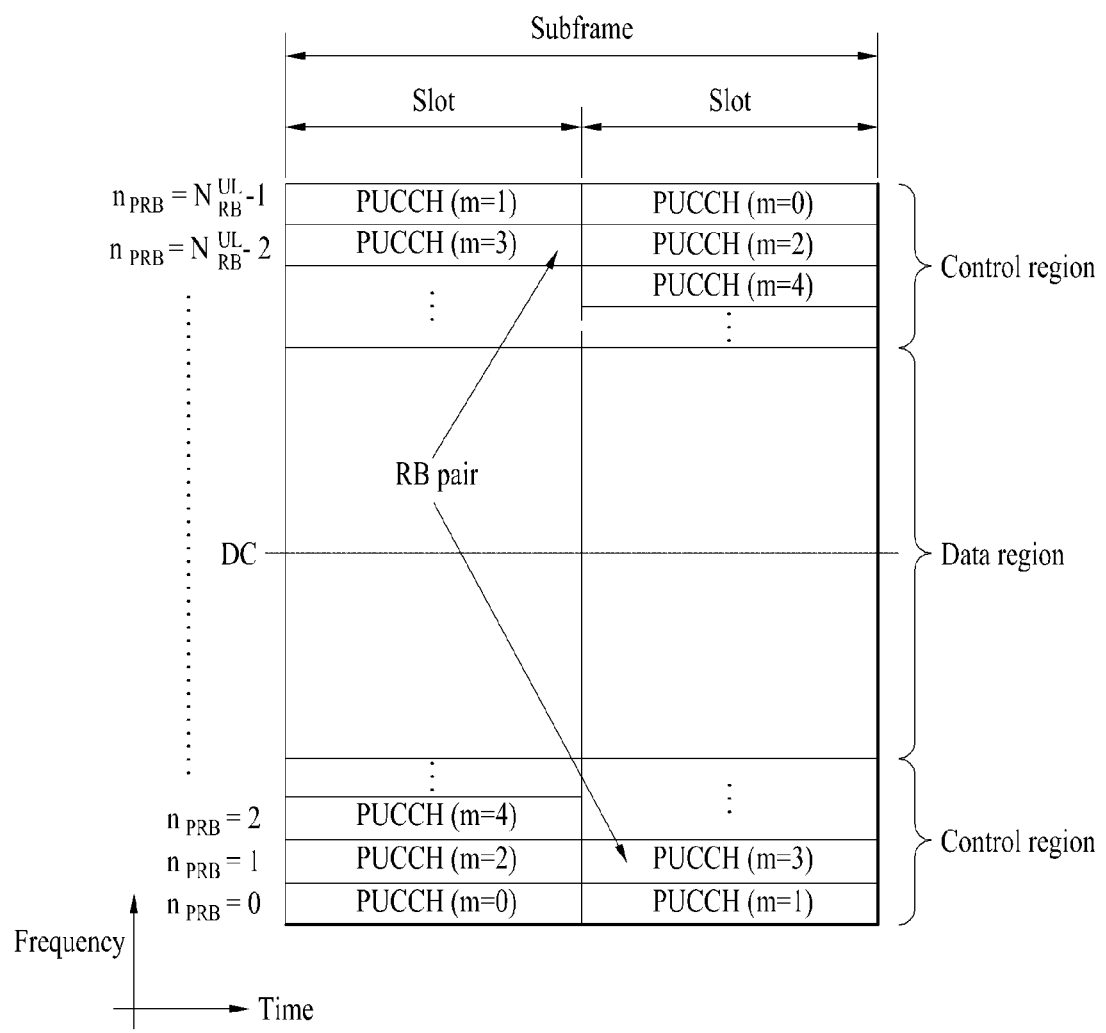
FIG. 4 illustrates an exemplary uplink subframe structure used in 3GPP LTE/LTE-A.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (HACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 3 shows the mapping relationship between PUCCH formats and UCI in LTE/LTE-A.

TABLE 3

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 3, PUCCH formats 1/1a/1b are used to transmit ACK/NACK information, PUCCH format 2/2a12b are used to carry CSI such as CQI/PMI/RI and PUCCH format 3 is used to transmit ACK/NACK information.

FIG. 5 illustrates configurations of wireless communication systems including multiple antennas.

Referring to FIG. 5(a), when the number of Tx antennas and the number of Rx antennas are respectively to $N_T$ and $N_R$, a theoretical channel transmission capacity is increased, compared to use of a plurality of antennas at only one of a transmitter and a receiver. The channel transmission capacity is increased in proportion to the number of antennas. Therefore, transmission rate and frequency efficiency can be increased remarkably. Given a maximum transmission rate $R_o$ that may be achieved with a single antenna, the transmission rate may be increased, in theory, to the product of $R_o$ and a transmission rate increase rate R, illustrated in Equation 1 due to an increase in channel transmission capacity in case of multiple antennas.

$$R_i = \min(N_T, N_R) \quad \text{[Equation 1]}$$

For instance, a MIMO communication system with 4 Tx antennas and 4 Rx antennas may achieve a four-fold increase in transmission rate theoretically, relative to a single-antenna system.

Communication in a MIMO system will be described in detail through mathematical modeling. It is assumed that $N_T$ Tx antennas and $N_R$ Rx antennas exist.

Regarding a transmission signal, up to $N_T$ pieces of information can be transmitted through the $N_T$ Tx antennas, as expressed as the following vector.

$$s = [s_1, s_2, \ldots, s_{N_T}] \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [Ps_1, Ps_2, \ldots Ps_{N_T}]^T \quad \text{[Equation 3]}$$

The transmission power-controlled transmission information vectors may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector X, which may be determined by Equation 5. Herein, $w_{ij}$ denotes a weight between an $i^{th}$ Tx antenna and a $j^{th}$ piece of information. W is called a weight matrix or a precoding matrix.

$$x = \begin{bmatrix} x_1 \\ x_2 \\ \vdots \\ x_i \\ \vdots \\ x_{N_T} \end{bmatrix} \quad [\text{Equation 5}]$$

$$= \begin{bmatrix} w_{11} & w_{12} & \cdots & w_{1N_T} \\ w_{12} & w_{12} & \cdots & w_{2N_T} \\ \vdots & & \ddots & \\ w_{i2} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

Here, $w_{ij}$ denotes a weight between an i-th Tx antenna and j-th information. W is also called a precoding matrix.

Given $N_R$ Rx antennas, signals received at the respective Rx antennas, $y_1, y_2, \ldots, y_N$, may be represented as the following vector.

$$y = [y_1, y_2, \ldots, y_{N_R}]^T \quad [\text{Equation 6}]$$

When channels are modeled in the MIMO communication system, they may be distinguished according to the indexes of Tx and Rx antennas and the channel between a j-th Tx antenna and an i-th Rx antenna may be represented as $h_{ij}$. It is to be noted herein that the index of the Rx antenna precedes that of the Tx antenna in $h_{ij}$.

FIG. 5(b) illustrates channels from $N_T$ Tx antennas to an i-th Rx antenna. The channels may be represented as vectors and matrices by grouping them. As illustrated in FIG. 5(b), channels from the $N_T$ Tx antennas to an i-th Rx antenna may be expressed as follows.

$$h_i^T = [h_{i1}, h_{i2}, \ldots, h_{iN_T}] \quad [\text{Equation 7}]$$

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & & \ddots \\ h_{N_R 1} & h_{N_R 2} & \cdots & h_{N_R N_T} \end{bmatrix} \quad [\text{Equation 8}]$$

Actual channels experience the above channel matrix H and then are added with Additive white Gaussian noise (AWGN). The AWGN $n_1, n_2, \ldots, n_{N_R}$ added to the $N_R$ Rx antennas is given as the following vector.

$$n = [n_1, n_2, \ldots, n_{N_R}]^T \quad [\text{Equation 9}]$$

From the above modeled equations, the received signal is given as $$y = \begin{bmatrix} y_1 \\ y_2 \\ \vdots \\ y_i \\ \vdots \\ y_{N_R} \end{bmatrix} \quad [\text{Equation 10}]$$

$$= \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R \times N_T$.

The rank of a matrix is defined as the smaller between the numbers of independent rows and columns. Accordingly, the rank of the matrix is not larger than the number of rows or columns. For example, the rank of the matrix H, rank(H) is limited as follows.

$$\text{rank}(H) \leq \min(N_T, N_R) \quad [\text{Equation 11}]$$

If the matrix is eigenvalue-decomposed, its rank may be defined as the number of non-zero eigenvalues. Similarly, in case of singular value decomposition (SVD), the rank may be defined as the number of non-zero singular values. Therefore, the rank of a channel matrix physically means the maximum number of different pieces of information that can be transmitted on given channels.

The present invention relates to a wireless communication system to which large-scale MIMO which can have multiple input/output antennas and a multi-dimension antenna structure is applied. The present invention proposes a hierarchical signal reception method which divides reception antenna ports into one or more antenna port groups, applies a reception beam to each antenna port group to generate a channel with improved receive power and applies a channel estimation and reception scheme to the channel when power of a reference signal (RS) received through an individual reception antenna is decreased due to UE power control on uplink or attenuation according to distance on downlink in the wireless communication system, causing inaccurate channel estimation.

Wireless communication systems following LTE Rel-12 consider introduction of an active antenna system (AAS). The AAS refers to a system configured such that each antenna includes an active element such as an amplifier, unlike a conventional passive antenna system in which an amplifier capable of adjusting the phase and magnitude of a signal is separated from an antenna. The AAS does not require an additional cable, connector, hardware, etc. to connect an amplifier to an antenna since it uses an active antenna and thus energy consumption and maintenance costs can be reduced. In particular, the AAS can generate an accurate beam pattern or 3-dimensional beam pattern considering a beam direction and a beam width to achieve an enhanced MIMO scheme since the AAS supports electronic beam control per antenna.

With the introduction of an enhanced antenna system such as the AAS, large-scale MIMO having multiple input/output antennas and a multi-dimension antenna structure is also considered. For example, when a 2-dimensional antenna array is employed, a 3-dimensional beam pattern can be formed according to active antennas of the AAS. If the 3-dimensional beam pattern is used at transmit antennas, quasi-static or dynamic beam formation in the vertical direction as well as the horizontal direction can be performed. For example, a vertical sector can be formed. Furthermore, when a reception beam is generated using a large-scale reception antenna, signal power increase according to antenna array gain can be expected. Accordingly, in the case of uplink, an eNB can receive a signal transmitted from a UE through multiple antennas and the UE can set transmit power thereof to a very low level in consideration of the gain of a large-size reception antenna to reduce interference.

Figure 6:
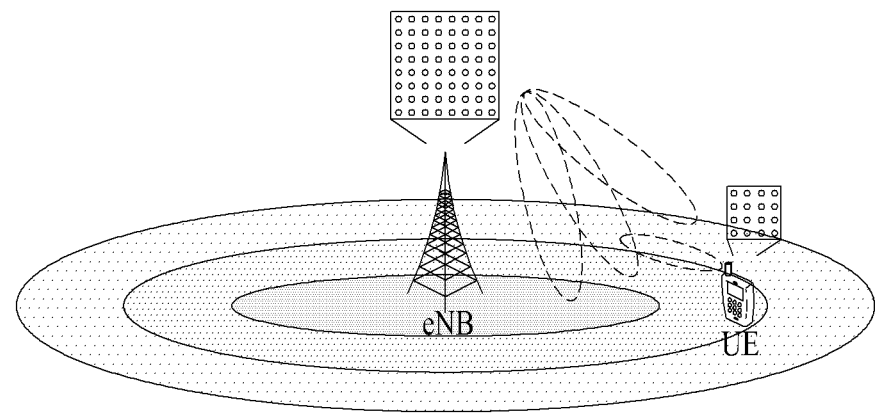
FIG. 6 illustrates a wireless communication system to which embodiments of the present invention are applied.

FIG. 6 illustrates a system in which an eNB and a UE include multiple transmit/reception antennas capable of performing AAS based 3D beam formation.

Figure 7:
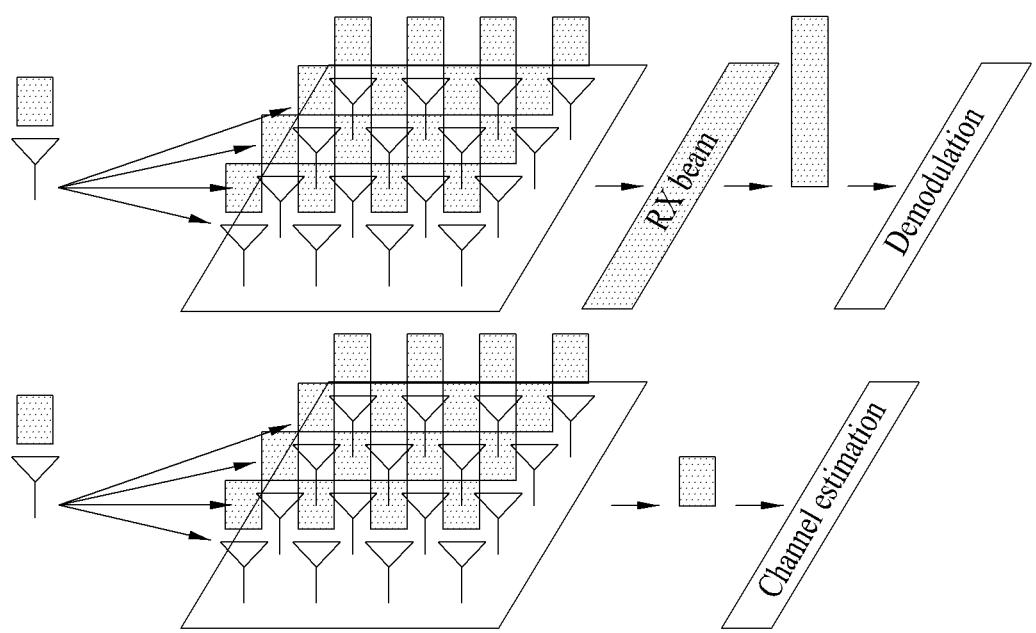
FIG. 7 illustrates an exemplary operation of receiving a radio signal in a wireless communication system.

When the UE decreases transmit power thereof in consideration of the gain of a large-scale reception antenna on uplink or the eNB supports a remote UE using the advantage of the large-scale reception antenna on downlink, accuracy of a channel estimation value may be decreased because receive power of a reference signal (RS) transmitted per antenna is not increased by a reception beam. When channel estimation accuracy is decreased, a reception beam suitable for data cannot be applied, deteriorating reception performance. For example, when the UE reduces transmit power thereof for energy-efficient transmission in consideration of the gain of the large-scale antenna used at the eNB, a problem related to the above-mentioned RS reception performance deterioration may be generated. Specifically, a UE having a reception antenna structure of a 4-row 4-column 2D antenna array can increase received signal intensity up to 16 times by applying optimized reception beams to a total of 16 reception antenna ports. Accordingly, performance that can be achieved by a single reception antenna can be accomplished with transmit power corresponding to one-sixteenth that of a single reception antenna. In the case of RS, however, channel estimation needs to be performed per reception antenna port and thus additional antenna gain is not obtained. Accordingly, when low power reception is performed per antenna port, channel estimation performance is remarkably deteriorated, affecting data reception performance. FIG. 7 illustrates the above-described example.

Therefore, the present invention proposes a hierarchical signal reception method capable of mitigating RS intensity decrease when a signal is received using a large-scale reception antenna. A hierarchical signal reception method according to an embodiment of the present invention may include a step of dividing physical or logical large-scale reception antenna ports into one or more antenna groups, a step of detecting or selecting a reception beam suitable for each antenna group and applying the reception beam to each antenna group and a step of estimating channels corresponding to the antenna groups using RSs received by the antenna groups and receiving signals using the estimated channels.

A wireless communication system in which uplink data transmission/reception is performed between a UE including a single transmit antenna and an eNB including N (e.g. N>1) reception antennas is assumed as an embodiment of the present invention.

A description will be given of a method of dividing the reception antennas into one or more antenna groups according to an embodiment of the present invention. Considering RS transmit power reduction (or RS receive power reduction according thereto), accuracy of channel estimation with respect to the reception antennas may be deteriorated. Accordingly, operation of applying appropriate reception beams to the reception antennas prior to channel estimation to increase RS receive power can be considered. In this case, since complexity of operation of detecting or selecting reception beams for all the reception antennas may be high, the reception antennas are divided into one or more antenna groups according to an embodiment of the present invention. Here, the numbers of antenna ports included in respective antenna groups may be different. The reception antennas may refer to physical antennas or logical antenna ports. In the above-mentioned wireless communication system including a single transmit antenna and N (e.g. N>1) reception antennas according to the present embodiment, N×1 channels can be represented as follows.

$$h = [h_1 \; h_2 \ldots h_N]^T \qquad \text{[Equation 12]}$$

Here, $h_N$ denotes an element corresponding to a received channel at an n-th reception antenna. A channel corresponding to an i-th antenna group including $K_i$ reception antennas can be represented as a product of a matrix $S_i$, which has a size of $K_i \times N$ and orthogonal columns and is normalized to 1, and a channel h, as represented by Equation 13.

$$h_i = S_i \cdot h \qquad \text{[Equation 13]}$$

Here, $\Sigma K_i$ need not be identical to the number of reception antennas, N.

When a method of simply selecting antennas to form antenna groups is applied as an example of the above-described operation of forming antenna groups, in a system including 4 reception antennas, channels corresponding to a first antenna group composed of antennas #1 and #3 and a second antenna group composed of antennas #2 and #4 can be represented as follows.

$$\begin{bmatrix} h_1 \\ h_2 \end{bmatrix} = \begin{bmatrix} S_1 \\ S_2 \end{bmatrix} \cdot h = \begin{bmatrix} 1 & 0 & 0 & 0 \\ 0 & 0 & 1 & 0 \\ 0 & 1 & 0 & 0 \\ 0 & 0 & 0 & 1 \end{bmatrix} \begin{bmatrix} h_1 \\ h_2 \\ h_3 \\ h_4 \end{bmatrix} = \begin{bmatrix} h_1 \\ h_2 \\ h_3 \\ h_4 \end{bmatrix} \qquad \text{[Equation 14]}$$

A description will be given of a method of dividing the reception antennas into one or more antenna groups based on average characteristics of channels according to an embodiment of the present invention. Spatial correlation indicating the relation between channels may be present between reception antennas and antennas having high correlation have similar channel values. High spatial correlation in a certain antenna group means that a beam pattern formed by the antenna group has specific directivity on average. Accordingly, an embodiment of the present invention proposes a method of dividing the reception antennas into antenna groups each having specific directivity on average.

Figure 8:
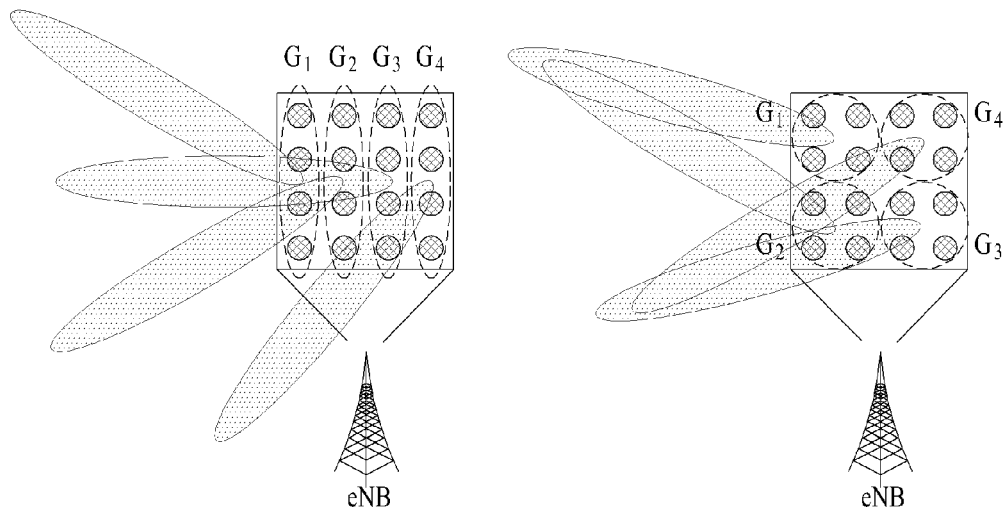
FIG. 8 illustrates an example of dividing antenna groups according to an embodiment of the present invention.

For example, specific antenna directivity can be considered in a process of forming a vertical sector in 3D MIMO. FIG. 8 illustrates the above-mentioned method of dividing reception antennas in an environment in which an eNB receives a signal from a UE through 16 antenna ports. An antenna group $G_i$ has a beam pattern corresponding to a sector $S_i$ formed in the vertical direction. According to an embodiment of the present invention, the reception antennas can be divided into antenna groups $G_i$. The antennas shown in FIG. 8 may be physical antennas or logical antenna ports.

Since accuracy of average information such as channel correlation increases as the number of measurement samples increases, it is possible to consider a method through which the UE measures channel correlation and then groups antennas having high correlation. For example, spatial correlation between channels corresponding to antenna groups can be represented as follows.

$$R_i E[h_i h_i^H] \quad \text{[Equation 15]}$$

Here, $E[\cdot]$ denotes a mean operator. When it is assumed that the size of each antenna group is determined in consideration of complexity, etc., spatial correlation based antenna group selection may be performed in such a manner that $S_i$ that maximizes the matrix norm value of a spatial correlation matrix $R_i$ is selected. This antenna group selection (or antenna grouping) may be repeated for all reception antennas and can be represented as follows.

$$S_i = \underset{G}{\operatorname{argmax}} \|E[Ghh^H G^H]\|_2 \quad \text{[Equation 16]}$$

Here, $\|\cdot\|_2$ denotes the Frobenius norm operator and G represents a matrix that has the same size as $S_i$ and orthogonal columns and is normalized to 1.

A description will be given of a method of applying a reception beam to each antenna group to increase the intensity of an RS received from a channel corresponding to each antenna group according to an embodiment of the present invention. As described above, on the assumption that transmit power of data and an RS is reduced in order efficiently use large-scale reception antenna gain, received signal intensity may be decreased when the RS is used for channel estimation without a supplementation. Accordingly, the present invention proposes a method of applying a reception beam capable of increasing RS receive power to each antenna group to generate a virtual channel in order to increase RS power at a receiver.

According to an embodiment of the present invention, a specific reception beam candidate set is set per antenna group and a reception beam is detected from the reception beam candidate set and updated. The process of applying a reception beam to each antenna group is performed prior to RS based channel estimation and thus a scheme specialized for reception beam detection needs to be considered. A receiver according to an embodiment of the present invention previously sets a reception beam candidate set (e.g. codebook), compares receive power levels when reception beams belonging to the reception beam candidate set are applied in a resource region having modest channel variation and selects a reception beam corresponding to highest receive power.

While different reception beams may be applied to antenna groups, some antenna groups may share a reception beam in consideration of complexity. Furthermore, even when all reception beams in the candidate set are searched during an initial detection process, the range of the candidate set may be limited based on a previously detected reception beam in consideration of channel similarity in the next reception beam detection process. That is, antenna groups having channel correlations greater than a specific value can share the candidate set. If information about a candidate set of another antenna group having a similar channel is present, reception beam selection can be performed based on the information.

Figure 9:
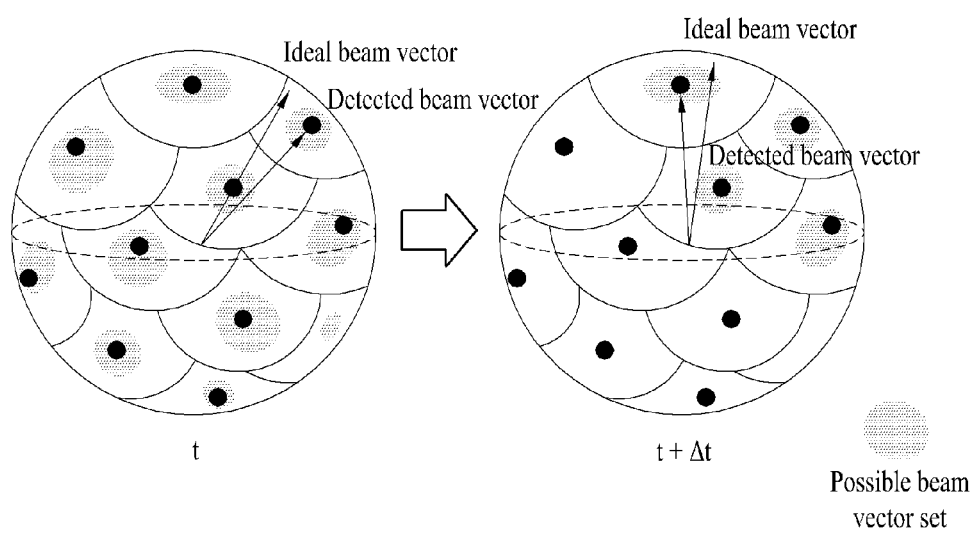
FIG. 9 illustrates an example of limiting a group-specific receive beam candidate set according to an embodiment of the present invention.

FIG. 9 illustrates the above-mentioned example of limiting the reception beam candidate set and shows a process of detecting a reception beam from a candidate set in the form of a codebook.

For example, if a reception beam candidate set to be applied to an i-th antenna group is given as a set $C_i = \{w_{i,1}, w_{i,2}, \ldots, w_{i,2^M}\}$ of reception beams that can be represented as M bits, a reception beam suitable for the i-th antenna group can be determined as follows in order to maximize receive power intensity of the i-th antenna group.

$$w_i = \underset{w_{i,k}}{\operatorname{argmax}} \|w_{i,k} h_i\| \quad \text{[Equation 17]}$$

Here, $\|\cdot\|$ denotes a vector norm operator. When a reception beam is newly selected in an environment in which channels slowly vary, a reception beam candidate set can be reconfigured as a smaller size set using vectors disposed at short distances (e.g. $\|w_i - w_{i,k}\|$) from the selected reception beam $w_i$ to reduce complexity of reception beam detection in the next detection process.

The present invention proposes a hierarchical reception scheme employing a suboptimized reception method based on a virtual channel to which a reception beam is applied per antenna group. When the selected reception beam is applied to M antenna groups, each antenna group forms a virtual channel to which the reception beam is applied as follows.

$$\tilde{h} = [\tilde{h}_1 \tilde{h}_2 \ldots \tilde{h}_M]^T \text{ where } \tilde{h} = h_i w_i \quad \text{[Equation 18]}$$

Here, $\tilde{h}_i$ denotes a virtual channel derived from each antenna group and $\tilde{h}$ denotes a virtual channel vector representing virtual channels derived from all antenna groups. Power of each virtual channel is improved according to the reception beam and thus channel estimation through an RS can be easily performed. Accordingly, the present invention proposes a hierarchical reception method employing a reception scheme such as MMSE (Minimum Mean Square Error) based on the virtual channels derived after the process of detecting or selecting a reception beam per antenna group. For example, a final reception beam weight for an MMSE receiver can be acquired as follows.

$$\tilde{w}_{MMSE} = \hat{\tilde{h}}^H (\hat{\tilde{h}} \hat{\tilde{h}}^H + R_n)^{-1} \quad \text{[Equation 19]}$$

Here, $\hat{\tilde{h}}$ denotes a virtual channel estimated using an RS to which a reception beam per antenna group is applied and $R_n$ denotes a co-variance matrix of noise and interference.

A description will be given of a hierarchical signal reception method based on channel virtualization according to another embodiment of the present invention. Hierarchical reception can be described as channel virtualization from the general point of view. For example, when an L×N linear transform matrix B is applied to a channel h received at a system having N reception antennas, L virtual channels $\tilde{h}$ can be formed as follows.

$$\tilde{h} = \begin{bmatrix} w_1 & 0 \\ 0 & w_2 \end{bmatrix} \begin{bmatrix} h_1 \\ h_2 \end{bmatrix} =$$

$$\begin{bmatrix} w_{1,1} & w_{1,2} & 0 & 0 \\ 0 & 0 & w_{2,1} & w_{2,2} \end{bmatrix} \begin{bmatrix} 1 & 0 & 0 & 0 \\ 0 & 0 & 1 & 0 \\ 0 & 1 & 0 & 0 \\ 0 & 0 & 0 & 1 \end{bmatrix} \cdot h = B \cdot h$$

[Equation 21]

where $B = \begin{bmatrix} w_{1,1} & 0 & w_{1,2} & 0 \\ 0 & w_{2,1} & 0 & w_{2,2} \end{bmatrix}$ Here, the linear transform matrix B can be set such that receive power of the L virtual channels is maximized under the condition that the linear transform matrix is normalized and the columns thereof are orthogonal. $\tilde{G}$ denotes a matrix which has the same size as B and orthogonal columns and is normalized to 1. For example, Equation 20 can be modified to Equation 21 according to Equations 14 and 17.

$$\tilde{h} = B \cdot h \text{ where } B = \underset{\tilde{G}}{\operatorname{argmax}} \|\tilde{G} \cdot h\|$$

[Equation 20]

A description will be given of a method of sequentially adjusting RS transmit power and using the adjusted RS transmit power for reception beam detection when large-scale reception antennas are applied according to another embodiment of the present invention. The above-described reception beam detection process may be a very complicated process in an initial stage having insufficient channel information. For example, if a UE having a reception antenna system including 16 antenna ports detects a reception beam for each of four antenna groups each of which is composed of four antenna ports, it is necessary to set a reception beam candidate set for four antenna ports as an N-bit codebook and then measure the intensities of received signals to which corresponding reception beams have been applied for each of the four antenna groups.

Since the above-described reception beam detection process is complicated, another embodiment of the present invention proposes a method of setting high RS transmit power only in the initial process of detecting a reception beam per antenna group and setting low RS transmit power in consideration of the effect of the reception beam in a process of updating the reception beam to reduce computational load of the receiver. In this case, information about a time-frequency resource of an RS transmitted with high transmit power needs to be transferred to the UE. Furthermore, information about the RS transmitted with high transmit power may be signaled to a neighboring cell since the RS can be regarded as unexpected interference applied to the neighboring cell.

For example, a UE performs a PUSCH power control process and an SRS (sounding reference signal) power control process discriminated by a specific offset value when transmitting an SRS on uplink in an LTE Rel-11 system. When the above-described large-scale reception antennas are applied, a method of independently allocating an SRS power value considering channel estimation performance separately from the power control process can be considered. For this, a method of signaling information for instructing maximum power to be aperiodically transmitted to the UE can be considered and one of aperiodic SRS transmission configurations can be defined as an operation using the maximum power and then indicated through an SRS request bit field of DCI format 4.

Alternatively, it is possible to consider a method of concentrating RS transmit power in a specific resource block (RB) when a UE having large-scale reception antennas receives a very weak signal on downlink in an extended coverage area. Here, a method of decreasing RS power in some RBs and increasing RS power in some RBs is applicable.

Figure 10:
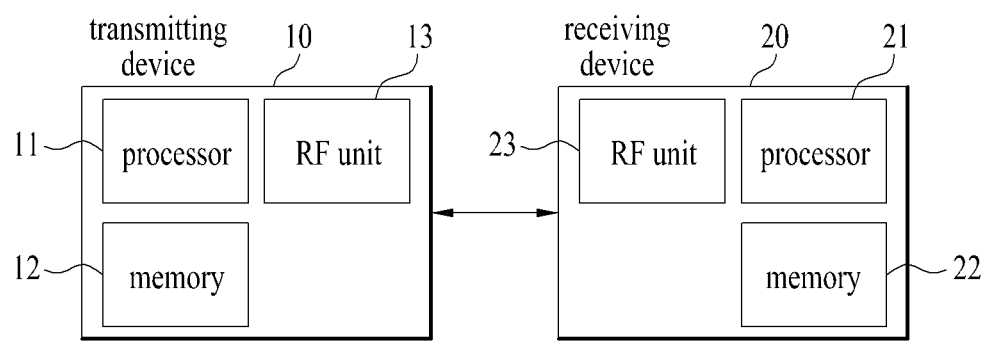
FIG. 10 is a block diagram of a device for implementing embodiments of the present invention.

FIG. 10 is a block diagram illustrating configurations of a transmitter 10 and a receiver 20 implementing the embodiments of the present invention. The transmitter 10 and the receiver 20 respectively include radio frequency (RF) units 13 and 23 capable of transmitting or receiving radio signals carrying information and/or data, signals, messages, etc., memories 12 and 22 storing information related to communication in a wireless communication system, processors 11 and 21 operably connected to the RF units 13 and 23 and the memories 12 and 22 and configured to control the memories 12 and 22 and/or the RF units 13 and 23 such that the transmitter 10 and the receiver 20 implement at least one of the above-described embodiments of the present invention.

The memories 12 and 22 can store programs for processing and control of the processors 11 and 21 and temporarily store input/output information. The memories 12 and 22 can be used as buffers. The processors 11 and 21 control overall operations of internal modules of the transmitter 10 and the receiver 20 in general. Particularly, the processors 11 and 21 can execute various control functions for implementing the present invention. The processors 11 and 21 may be called controllers, microcontrollers, microprocessors, microcomputers, etc. The processors 11 and 21 may be implemented by hardware, firmware, software, or combinations thereof. When the embodiments of the present invention are implemented using hardware, ASICs (Application Specific Integrated Circuits), DSPs (Digital Signal Processors), DSPDs (Digital Signal Processing Devices), PLDs (Programmable Logic Devices) or FPGAs (Field Programmable Gate Arrays) configured to implement the present invention may be included in the processors 11 and 21. In a firmware or software configuration, the embodiments of the present invention may be implemented in the form of a module, a procedure, a function, etc. Firmware or software configured to implement the present invention may be included in the processors 11 and 21 or stored in the memories 12 and 22 and executed by the processors 11 and 21.

The processor 11 of the transmitter 10 performs predetermined coding and modulation on a signal and/or data scheduled by the processor 11 or a scheduler connected to the processor 11 to be transmitted and transmits the signal and/or data to the RF unit 13. For example, the processor 11 converts data streams to be transmitted into K layers through demultiplexing, channel coding, scrambling and modulation. A coded data stream may be called a codeword and is equivalent to a transport block corresponding to a data block provided by the MAC layer. A transport block (TB) is coded into a codeword and each codeword is transmitted in the form of one or more layers to the receiver. The RF unit 13 may include an oscillator for frequency up-conversion. The RF unit 13 may include Nt (Nt being a positive integer greater than 1) transmit antennas.

A signal processing procedure of the receiver 20 is reverse to the signal processing procedure of the transmitter 10. The RF unit 23 of the receiver 20 receives a radio signal transmitted from the transmitter 10 under the control of the processor 21. The RF unit 23 may include Nr reception antennas and frequency-down-converts signals received through the reception antennas into baseband signals. The RF unit 23 may include an oscillator for frequency down-conversion. The processor 21 can decode and demodulate radio signals received through the reception antennas to restore data that the transmitter intended to transmit.

Each of the RF units 13 and 23 includes one or more antennas. The antennas transmit signals processed by the RF units 13 and 23 to the outside or receive external radio signals and transfer the received signals to the RF units 13 and 23 under the control of the processors 11 and 21 according to an embodiment of the present invention. The antennas may be called antenna ports. Each antenna may correspond to a physical antenna or may be configured using a combination of one or more physical antenna elements. A signal transmitted from each antenna cannot be decomposed by the receiver 20. An RS transmitted corresponding to a specific antenna defines the specific antenna with respect to the receiver 20 and enables the receiver 20 to perform channel estimation for the antenna irrespective of a single radio channel from a physical antenna or a composite channel from a plurality of physical antenna elements. That is, an antenna is defined such that a channel on which a symbol on the antenna is transferred can be derived from a channel on which a different symbol on the same antenna is transferred. An RF unit supporting MIMO which transmits data using a plurality of antennas can be connected to two or more antennas.

In the embodiments of the present invention, the UE operates as the transmitter 10 on uplink and operates as the receiver 20 on downlink. In the embodiments of the present invention, the eNB operates as the receiver 20 on uplink and operates as the transmitter 10 on downlink.

The transmitter and/or the receiver can perform at least one combination of the above-described embodiments of the present invention.

While the embodiments of the present invention have been described with respect to the receiver operating on uplink, the embodiments of the present invention can also be applied to a receiver operating on downlink.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The present invention is applicable to wireless communication devices such as a UE, a relay, an eNB, etc.

What is claimed is:

1. A method for receiving a radio signal in a receiver including a 2-dimensional antenna array which consists of a plurality of antenna elements in a wireless communication system, the method comprising:
   dividing the plurality of antenna elements into a plurality of groups;
   determining a group-specific reception beam for each of the plurality of groups;
   applying the group-specific reception beam to a channel corresponding to each of the plurality of groups to acquire virtual channels respectively corresponding to the plurality of groups; and
   estimating channels respectively corresponding to the plurality of groups based on reference signals received in the virtual channels.

2. The method according to claim 1, wherein the dividing of the plurality of antenna elements comprises assigning at least two antenna elements of the plurality of antenna elements to the same group if a correlation metric between at least two channels corresponding to the at least two antenna elements is higher than a specific value.

3. The method according to claim 1, wherein the determining of the group-specific reception beam comprises selecting the group-specific reception beam from a candidate set for each of the plurality of groups such that the intensity of a signal received in each of the plurality of groups is maximized,
   wherein the candidate set consists of one or more candidate reception beams.

4. The method according to claim 3, wherein the candidate set is shared between two or more of the plurality of groups.

5. The method according to claim 3, further comprising selecting one or more candidate reception beams within a predetermined distance from the group-specific reception beam selected from the candidate set for each of the plurality of groups to update the candidate set for each of the plurality of groups.

6. A receiver including a 2-dimensional antenna array which consists of a plurality of antenna elements in a wireless communication system, the receiver comprising:
   a radio frequency (RF) unit; and
   a processor configured to control the RF unit,
   wherein the processor is configured to divide the plurality of antenna elements into a plurality of groups, to determine a group-specific reception beam for each of the plurality of groups, to apply the group-specific reception beam to a channel corresponding to each of the plurality of groups to acquire virtual channels respectively corresponding to the plurality of groups and to estimate channels respectively corresponding to the plurality of groups based on reference signals received in the virtual channels.

7. The receiver according to claim 6, wherein the processor is configured to assign at least two antenna elements of the plurality of antenna elements to the same group if a correlation metric between at least two channels corresponding to the at least two antenna elements is higher than a specific value.

8. The receiver according to claim 6, wherein the processor is configured to select the group-specific reception beam from a candidate set for each of the plurality of groups such that the intensity of a signal received through each of the plurality of groups is maximized,
   wherein the candidate set consists of one or more candidate reception beams.

9. The receiver according to claim 6, wherein the candidate set is shared between two or more of the plurality of groups.

10. The receiver according to claim 6, wherein the processor is configured to select one or more candidate reception beams within a predetermined distance from the group-specific reception beam selected from the candidate set for each of the plurality of groups to update the candidate set for each of the plurality of groups.

* * * * *